United States Patent [19]

Parker et al.

[11] Patent Number: 4,775,705

[45] Date of Patent: * Oct. 4, 1988

[54] FRICTION MATERIALS AND THEIR MANUFACTURE

[75] Inventors: Euan Parker; Bruno Grele, both of Smithville, Tenn.

[73] Assignee: T&N plc, Manchester, England

[*] Notice: The portion of the term of this patent subsequent to Apr. 2, 2004 has been disclaimed.

[21] Appl. No.: 943,352

[22] Filed: Dec. 19, 1986

Related U.S. Application Data

[63] Continuation-in-part of Ser. No. 707,565, Mar. 4, 1985, Pat. No. 4,656,203.

[51] Int. Cl.$^4$ .......................... C08J 5/14; C08K 7/02; C08L 61/06; F16D 69/02
[52] U.S. Cl. .......................... 523/153; 192/107 M; 523/155; 523/156; 523/158; 264/86; 264/87
[58] Field of Search ................ 523/153, 155, 156, 158; 192/107 M; 264/86, 87

[56] References Cited

U.S. PATENT DOCUMENTS

| | | | |
|---|---|---|---|
| 4,118,528 | 10/1978 | Lowry | 192/107 M |
| 4,349,595 | 9/1982 | Trainor et al. | 192/107 M |
| 4,374,059 | 2/1983 | Wagner | 523/155 |
| 4,386,168 | 5/1983 | Fujimaki et al. | 523/155 |
| 4,394,211 | 2/1983 | Gallagher et al. | 523/156 |
| 4,403,047 | 9/1983 | Albertson | 523/155 |
| 4,465,796 | 8/1984 | Leroy et al. | 523/155 |
| 4,476,256 | 10/1984 | Hamermesh | 523/155 |
| 4,477,605 | 10/1984 | Okubo et al. | 523/155 |
| 4,508,855 | 4/1985 | Deters | 523/156 |

FOREIGN PATENT DOCUMENTS

| | | |
|---|---|---|
| 1008801 | 11/1965 | United Kingdom . |
| 1604839 | 12/1981 | United Kingdom . |
| 1604827 | 12/1981 | United Kingdom . |
| 1604828 | 12/1981 | United Kingdom . |

*Primary Examiner*—Allan M. Lieberman
*Attorney, Agent, or Firm*—Nixon & Vanderhye

[57] ABSTRACT

Non-asbestos brake pads made of reinforcing, temperature resistant, web-forming fibers such as aromatic polyamide pulp, optionally including other fibers and friction and wear modifiers is described. The brake pads have an actual density not greater than 88% and not less than a 60% theoretical density. The pads are made by the slurry process in which the pad-forming constituents are fed as a slurry into a mold, dewattered and compressed, dried to a preform then heated and pressed to consolidate the preform to substantially the finished density without completely curing the binder. The consolidated pad is then baked to fully cure the binder.

16 Claims, 2 Drawing Sheets

Fig. I

FRICTION MATERIALS AND THEIR MANUFACTURE

CROSS-REFERENCE TO RELATED APPLICATIONS

This application is a continuation-in-part of application Ser. No. 707,565, filed Mar. 4, 1985, now U.S. Pat. No. 4,656,203.

BACKGROUND OF THE INVENTION

This invention relates to friction materials and their manufacture, and more particularly to brake pads.

Brake pads are usually manufactured by one of two well-known techniques. In the first method, known as press-forming, an uncured pad containing a binder, reinforcing fibers, fillers and friction modifiers is prepared with substantially finished density using the action of pressure in a suitably shaped die. The binder, normally a thermosetting resin or vulcanizable elastomer or mixtures thereof, flows under the high pressure in the die to contact the reinforcing fibers and particles of filler or friction modifier but is not substantially cured in the die. Curing of the binder is achieved by subsequent baking in an oven. In the second method, known as press-curing, a mixture of fibers, binders, fillers, and friction modifiers is charged to a mold cavity in a die and then molded under heat and pressure sufficient to substantially cure the binder. The mix may be charged to the die as a loose particulate mix or this mix may be molded under pressure only into the form of a preform first. The pads in this case are also usually baked at temperatures of 150 degrees C.–250 degrees C. to complete the cure of the binder and also to improve friction properties.

There have been proposals to replace asbestos fibers in friction materials by other fibers such as cellulose, glass, mineral wools (e.g., basalt or slagwools), alumino-silicate, polyacrylonitrile, polyamides, aromatic polyamides and carbon fibers, UK Pat. Nos. 1604827, 1604828 and 1604839 being examples of such proposals. We have found that conventionally manufactured brake pads using non-asbestos fibers are difficult to make with anything other than low volumes of fibers e.g. up to 20 percent by volume. They are also considered to achieve densities which are close to the theoretical densities of the mix of materials used. This results in impermeable structures with very low void volumes. Such non-asbestos brake pads are hard and dense and often possess good performance but can have poor resistance to cracking at high temperatures.

We have found that non-asbestos brake pads may be manufactured with higher volumes of fiber with all its attendant advantages, and that the structural integrity and fade properties of the brake pads may be remarkably improved thereby.

SUMMARY OF THE INVENTION

Thus the present invention provides a non-asbestos brake pad made of reinforcing fibers embedded in a matrix of binder material, in which the reinforcing fiber comprises a temperature resistant web-forming fiber in an amount of from 22 percent to 40 percent by volume of total solids in the pad, the pad optionally including other fibers, fillers and friction and wear modifiers.

The invention also provides a method for the manufacture of a non-asbestos brake pad which comprises the steps of:

A. feeding into a mold an aqueous slurry of curable binder material and temperature resistant web-forming reinforcing fibers and optionally other fibers, fillers and friction and wear modifiers, said mold having at least one wall through which water may be removed, B. compressing the slurry in the mold and removing water therefrom in order to form a damp preform of the brake pad, C. drying the preform, D. subjecting the dry preform to heat and pressure in a die to consolidate the preform to substantially the finished density of the brake pad without completing cure of the binder, and E. baking the consolidated pad to fully cure the binder.

BRIEF DESCRIPTION OF THE DRAWINGS

The invention will be further described with reference to the attached drawings in which.

DETAILED DESCRIPTION OF THE INVENTION

Figure 1:
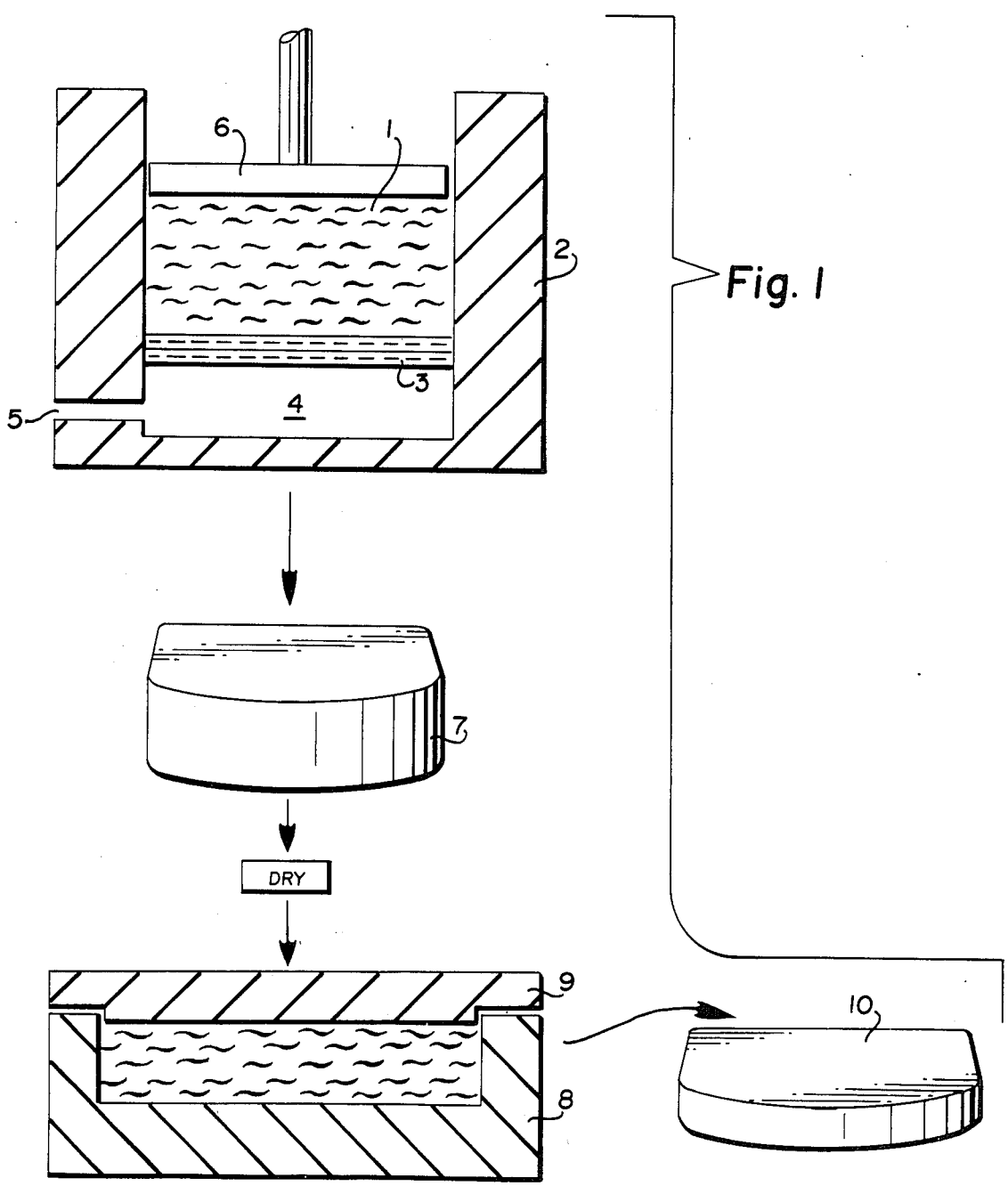
FIG. 1 is a schematic diagram illustrating the process used to manufacture a brake pad by this invention.

The non-asbestos brake pads according to the present invention incorporate reinforcing fibers which may be inorganic or organic or mixtures of fibers in which both types are present. Typically the brake pads may include fibers of glass, mineral wool, alumino-silicate, metals such as steel, cellulose, polyamides, particularly aromatic polyamides such as those available from DuPont under the trade mark KEVLAR, polyacrylonitrile, polyvinyl alcohol and as previously indicated, so on. At least some of the fibers used must be web-forming fibers in order that the fibers will form a web in the mold during the preforming step thereby to entrap the other ingredients of the pad within the mold when the water in the slurry is being removed.

Preferred web-forming fibers are pulps of temperature resistant organic fibers usch as cellulose, polyacrylonitrile and polyamides. Particularly preferred are aromatic polyamide pulps owing to their high temperature resistance. Mixtures of web-forming organic fibers such as aromatic polyamide pulp with cellulose pulp may be used.

The total amount of fibers in the brake pads is preferably in the range of 22 to 60 percent by volume total solids.

The binder material mentioned previously is preferably based on binder polymers usual for use in brake pads. These binders are well known in the art and include resins based on phenol and formaldehyde and related resins, and rubbers such as nitrile rubbers, natural rubber and styrene-butadiene rubber. Mixtures of resin and rubber may be used, the particular combination of polymers chosen depending upon the manufacturing characteristics desired and properties wanted in the finished brake pads. Amounts of binder polymers of at least 15 percent by volume up to as much as 40 percent by volume may be used in the brake pads, these figures being percent by volume of total solids in the finished product and ignoring volume of voids in the product. Preferably the amount of resin binder falls in the range of about 25 to about 30 percent by volume total solids.

Friction and wear modifiers and fillers of the usual types may be employed, examples of such materials being carbon black, graphite, talc, barytes, polymerized cashew nut shell resin particles, and metal powders, e.g., brass, copper and alumina alloys, metallic sulphides, metallic oxides, vermiculite. When present such modifiers are incorporated in the range of about 15 percent to about 30 percent by volume of total solids.

With respect to finished brake pads, the actual density of the brake pad wil normally be less than the theoretical density of the pad and preferably the density is at least about 12 percent less than theoretical. We have found that with reducing actual density there is improvement in high temperature fade resistance but some increase in wear. At actual densities of about 60 percent theoretical and below, the structural integrity of the pad is apt to suffer and the pad is unsuitable for its intended purpose. Preferably the actual density of the pad is greater than 72 percent of theoretical and it is particularly preferred that the actual density is in a range of about 75 percent to 88 percent of theoretical density. One skilled in the manufacture of friction products will have no difficulty in empirically selecting the appropriate density having regard to the formulation used, the pressing/heating conditions employed, and the intended used of the product.

It has been found that non-asbestos brake pads of the present invention using the compositions outlined above may achieve significant increases in fade resistance when compared with non-asbestos pads made by conventional techniques. We have also found that the brake pads of the invention, having higher void contents than usual tend to give rise to less noise than conventional pads. The brake pads are useful as disc brake pads in automobiles and for brakes on railway vehicles.

The process of the invention will now be described in more detail, by way of example only, with reference to the accompanying drawings.

A slurry in water of the ingredients of the brake pad formulation to be used is prepared in a mixer. A measured amount of slurry 1 is fed into a mold 2 as shown in FIG. 1. The mold 2 has a wall 3 which is permeable to water below which is a cavity 4 with an outlet 5 through which water may be drawn away.

When the slurry 1 has been charged to the mold 2 the mold is closed by a plunger 6 to which pressure is then applied. Preferably suction is then also applied to the outlet 5 to assist in water removal. The pressure applied at this stage in the process need not be great since the objective is to produce a handleable preform. Prefered pressure is in the range of 30 to 100 psi.

The preform 7 produced is still relatively wet and must be dried e.g. in warm air at a temperature of about 150 degrees F.

Once dry the preform may be inserted in a die 8 which is then closed under heat and pressure by a punch 9 to consolidate the pad to its final density and substantially cure the binder producing a stable molded pad 10. The temperature and pressure used in this phase are much higher, being typically 300 degrees F. and several tons per square inch.

Figure 2:
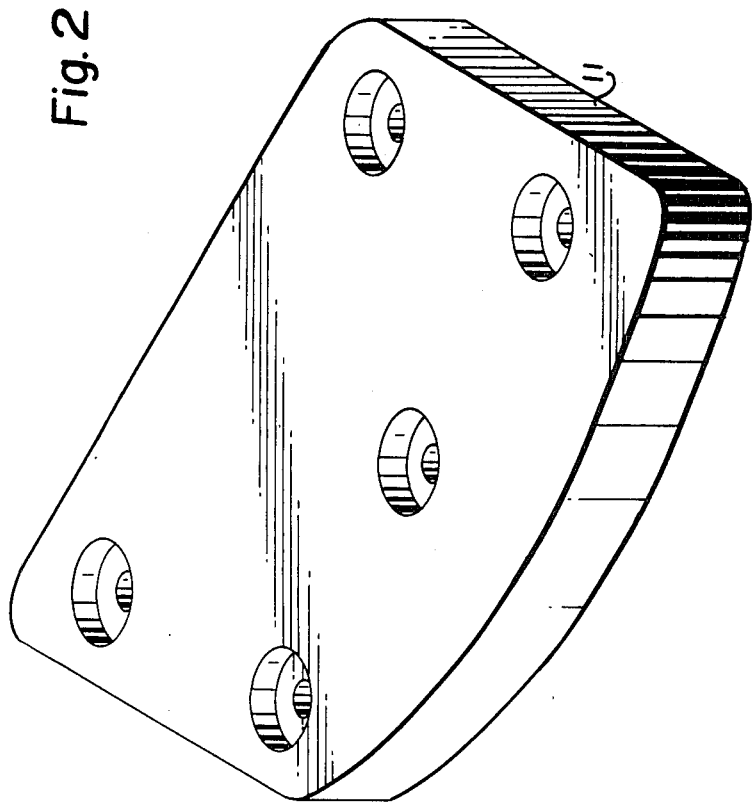
FIG. 2 is perspective view of a finished brake pad.

Finally the pad is baked in an air-oven for several hours to completely cure the binder, then ground and drilled to produce the finished product 11 shown in FIG. 2.

The process as described above is to produce a brake pad which is to be riveted to a carrier plate. If it is desired to produce a brake pad which is molded on to a back-plate, this can be achieved simply by assembling a dry preform with a suitable back plate in the die 8. In this case the die 8 is modified to accommodate a back plate.

The invention will now be further illustrated by means of detailed examples.

EXAMPLES 1 AND 2

Non-asbestos brake pads were made by two different methods for comparison from a composition which was as follows:

|  | Parts by volume |
| --- | --- |
| Phenol resin | 27 |
| Aromatic polyamide "pulp" fiber (KEVLAR) fiber length 6 mm | 34 |
| Ceramic Fiber | 16 |
| Friction and Wear Modifiers | 23 |

The theoretical density of this mix was 1.84 gms/cc.

In the first case (example 1) the brake pads were made by a conventional press-curing technique. The ingredients were mixed together in the absence of solvents or water, and were loaded dry into a preforming die. A dry preform was prepared under a pressure of about 800 psi, the preform was loaded into a press-curing die, pressed at a pressure of about 3 tons per square inch and temperature of about 300 degrees F. to form a brake pad with an actual density of 1.49 gms/cc in which the binder was substantially cured. The pads so made were baked in an oven for 4 hours at 400 degrees F. and ground and drilled.

In the second case (example 2) and brake pads were made according to the process of the invention. The ingredients were mixed in water to form an aqueous slurry with a solid content of about 10 percent by weight. Slurry was fed into a mold with a water permeable wall and water removed under a pressure of about 40 psi to prepare a wet preform.

The preform was dried in air at a temperature of about 150 degrees C. and then loaded into a die where it was molded into a brake pad under the same conditions as used in Example 1 and baked and finished as before. The actual density of the finished pad was 1.49 gms/cc as in Example 1.

The brake pads prepared in examples 1 and 2 were of a configuration suitable for the rear brakes of a 1986 Ford Thunderbird incorporating a parking brake thus testing for static friction is important. The pads were also tested for fade and recovery. These tests were carried out using an inertia dynamometer with suitable fixtures and mountings. The dynamometer inertia was chosen to simulate the dynamic braking requirements of the vehicle. The fade stops were from 60 mph to rest targeting for a 15 ft per second per second deceleration. Successive stops with a 60 second interval ensures that the brake pads heat up to temperatures where fade may be expected to occur. The recovery stops were from 30 mph to rest targeting for a 11 ft. per second per second deceleration. Successive stops with a 75 second interval ensures that the pads cool down to normal operating temperatures. The average pad temperature deceleration and friction coefficient were recorded for each stop and the results of these tests, the fade and recovery tests being out in rapid succession in a complete series for each pad are shown in tables I to V.

It will be seen from the tabulated results that the pads made in accordance with the invention consistently outperformed the pads made by the usual method. The reason for this is not yet clear, but it has been repeatedly observed over a series of tests.

Furthermore the process used in making the pads in accordance with the invention inherently gives rise to less environmental problems with dust during the initial mixing and preforming stages of the process, a dry mix of the formulation used in these examples being particularly difficult to handle.

TABLE I

Static Friction Measurement

| Brake Pressure (psi) | Friction MU (forward) | | Friction MU (Reserve) | |
|---|---|---|---|---|
| | Ex. 1 | Ex. 2 | Ex. 1 | Ex. 2 |
| 100 | 0.33 | 0.39 | 0.33 | 0.41 |
| 200 | 0.3 | 0.37 | 0.32 | 0.39 |
| 300 | 0.34 | 0.39 | 0.34 | 0.42 |
| 400 | 0.36 | 0.4 | 0.34 | 0.43 |
| 500 | 0.36 | 0.39 | 0.33 | 0.41 |
| 600 | 0.37 | 0.38 | 0.35 | 0.4 |
| 800 | 0.37 | 0.37 | 0.35 | 0.38 |
| 1000 | 0.37 | 0.37 | 0.37 | 0.37 |
| 1200 | 0.38 | 0.37 | 0.37 | 0.36 |

TABLE II

First Fade Test

| Stop Number (from 60 mph) | Pad Temperature (F.) | | Deceleration FT. SEC −2 | | MU | |
|---|---|---|---|---|---|---|
| | Ex. 1 | Ex. 2 | Ex. 1 | Ex. 2 | Ex. 1 | Ex. 2 |
| 1 | 150 | 150 | 15.2 | 15.5 | 0.34 | 0.42 |
| 2 | 249 | 261 | 15 | 15.1 | 0.3 | 0.43 |
| 3 | 322 | 342 | 14.5 | 15 | 0.25 | 0.41 |
| 4 | 370 | 398 | 13.9 | 15 | 0.22 | 0.39 |
| 5 | 402 | 434 | 13 | 15.2 | 0.19 | 0.39 |
| 6 | 420 | 461 | 13.4 | 15.1 | 0.19 | 0.37 |
| 7 | 430 | 476 | 12.4 | 14.9 | 0.19 | 0.34 |
| 8 | 440 | 486 | 12.2 | 14.8 | 0.17 | 0.32 |
| 9 | 444 | 491 | 11.8 | 14.8 | 0.17 | 0.29 |
| 10 | 445 | 493 | 12.4 | 15 | 0.18 | 0.3 |

TABLE III

First Recovery Test

| Stop Number (from 30 mph) | Pad Temperature (F.) | | Deceleration FT. SEC −2 | | MU | |
|---|---|---|---|---|---|---|
| | Ex. 1 | Ex. 2 | Ex. 1 | Ex. 2 | Ex. 1 | Ex. 2 |
| 1 | 489 | 537 | 10.2 | 10.7 | 0.29 | 0.43 |
| 2 | 427 | 469 | 10.5 | 10.6 | 0.34 | 0.45 |
| 3 | 380 | 417 | 10.6 | 10.5 | 0.4 | 0.46 |
| 4 | 344 | 377 | 10.7 | 10.6 | 0.42 | 0.44 |
| 5 | 321 | 347 | 10.7 | 10.6 | 0.43 | 0.47 |
| 6 | 305 | 322 | 10.5 | 10.8 | 0.43 | 0.48 |
| 7 | 292 | 303 | 10.7 | 10.8 | 0.43 | 0.48 |
| 8 | 285 | 289 | 10.7 | 10.7 | 0.43 | 0.49 |
| 9 | 277 | 278 | 10.7 | 10.8 | 0.43 | 0.48 |
| 10 | 268 | 266 | 10.7 | 10.8 | 0.44 | 0.5 |
| 11 | 260 | 260 | 10.8 | 10.8 | 0.41 | 0.48 |
| 12 | 253 | 252 | 10.7 | 10.7 | 0.41 | 0.49 |

TABLE IV

Second Fade Test

| Stop Number (from 30 mph) | Pad Temperature (F.) | | Deceleration FT. SEC −2 | | MU | |
|---|---|---|---|---|---|---|
| | Ex. 1 | Ex. 2 | Ex. 1 | Ex. 2 | Ex. 1 | Ex. 2 |
| 1 | 150 | 150 | 15 | 15.3 | 0.34 | 0.43 |
| 2 | 249 | 254 | 14.7 | 15.1 | 0.27 | 0.44 |
| 3 | 319 | 332 | 14.1 | 15.2 | 0.23 | 0.42 |
| 4 | 366 | 384 | 13.3 | 15.1 | 0.2 | 0.41 |
| 5 | 400 | 418 | 12.7 | 15 | 0.19 | 0.4 |
| 6 | 430 | 440 | 11.9 | 14.9 | 0.18 | 0.36 |
| 7 | 438 | 458 | 11.7 | 14.9 | 0.17 | 0.34 |
| 8 | 470 | 472 | 11.6 | 14.8 | 0.17 | 0.32 |
| 9 | 458 | 486 | 11.8 | 14.7 | 0.17 | 0.3 |
| 10 | 463 | 493 | 12 | 14.9 | 0.18 | 0.3 |
| 11 | 487 | 498 | 12 | 14.8 | 0.17 | 0.29 |
| 12 | 467 | 501 | 11.8 | 14.7 | 0.17 | 0.29 |
| 13 | 472 | 501 | 12.3 | 14.7 | 0.18 | 0.29 |
| 14 | 469 | 504 | 12.4 | 14.7 | 0.18 | 0.29 |
| 15 | 466 | 502 | 12.8 | 14.6 | 0.18 | 0.3 |

TABLE V

Second Recovery Test

| Stop Number (from 30 mph) | Pad Temperature (F.) | | Deceleration FT. SEC −2 | | MU | |
|---|---|---|---|---|---|---|
| | Ex. 1 | Ex. 2 | Ex. 1 | Ex. 2 | Ex. 1 | Ex. 2 |
| 1 | 505 | 540 | 10.2 | 10.6 | 0.3 | 0.42 |
| 2 | 442 | 470 | 10.4 | 10.6 | 0.35 | 0.44 |
| 3 | 392 | 418 | 10.6 | 10.7 | 0.39 | 0.46 |
| 4 | 355 | 378 | 10.6 | 10.7 | 0.39 | 0.47 |
| 5 | 333 | 345 | 10.8 | 10.6 | 0.43 | 0.47 |
| 6 | 311 | 322 | 10.7 | 10.6 | 0.44 | 0.47 |
| 7 | 296 | 303 | 10.7 | 10.8 | 0.43 | 0.48 |
| 8 | 283 | 386 | 10.7 | 10.7 | 0.43 | 0.47 |
| 9 | 273 | 274 | 10.8 | 10.9 | 0.43 | 0.49 |
| 10 | 269 | 268 | 10.6 | 10.8 | 0.44 | 0.49 |
| 11 | 265 | 259 | 10.6 | 10.7 | 0.43 | 0.48 |
| 12 | 262 | 255 | 10.6 | 10.8 | 0.43 | 0.49 |

We claim:

1. A non-asbestos brake pad made from a composition comprising reinforcing fibers embedded in a matrix of binder material, wherein the reinforcing fiber comprises a temperature resistant web-forming fiber in an amount of from 22 percent to 40 percent by volume of total solids in the pad and the binder is present in an amount of 15 percent to 40 percent by volume of the total solids in the pad.

2. A brake pad according to claim 1 in which the web-forming fiber is derived from a pulp of an organic fiber.

3. A brake pad according to claim 2 in which said organic fiber is an aromatic polyamide fiber.

4. A brake pad according to claim 1 which includes also inorganic fibers selected from the group consisting of steel fiber, glass fiber, mineral wool, basalt fiber, and ceramic fiber.

5. A brake pad according to claim 1 having an actual density not greater than 88 percent and not less than 60 percent of theoretical density.

6. A brake pad according to claim 5 in which the actual density of the pad is in the range of 75 percent to 88 percent of theoretical density.

7. A brake pad according to claim 6 wherein the fibers include ceramic fibers and aromatic polyamide pulp fibers.

8. A brake pad according to claim 1 wherein the total amount of fibers in the brake pad is in the range of 22 to 60 percent by volume of total solids in the pad.

9. A brake pad according to claim 1 which includes other fibers, friction modifiers and wear modifiers in an amount in the range of about 15 percent to about 30 percent by volume of total solids in the pad.

10. A method for the manufacture of a non-asbestos brake pad which comprises the steps of:
 A. feeding into a mold an aqueous slurry of curable binder material and temperature resistant web-forming reinforcing fibers, said mold having at least one wall through which water may be removed, wherein said aqueous slurry comprises said curable binder material in the range of about 15 to about 40 percent by volume of total solids in the pad and said web-forming reinforcing fibers in an amount of from 22 percent to 40 percent by volume of total solids in the pad,
 B. compressing the slurry in the mold and removing the water therefrom in order to form a damp preform of the brake pad,
 C. drying the preform,
 D. subjecting the dry preform to heat and pressure in a die to consolidate the preform to substantially the finished density of the brake pad without completing cure of the binder, and
 E. baking the consolidated pad to fully cure the binder.

11. A method according to claim 10 in which the pressure applied in the mold in step 2 is in the range of 30 to 100 psi.

12. A method according to claim 10 in which a vacuum is applied behind a mold wall which is permeable to water in order to assist in drawing water out of the mold through the mold wall.

13. A method according to claim 10 in which in step 4 the binder is substantially but not completely cured.

14. A method according to claim 10 in which in step 4 the preform is assembled with a back plate such that the pad is molded onto the back plate using the heat and pressure applied.

15. A method according to claim 10 wherein the aqueous slurry further comprises other fibers, friction modifiers and wear modifiers in an amount in the range of about 15 percent to about 30 percent by volume of total solids in the pad.

16. A non-asbestos brake pad made of reinforcing fibers embedded in a matrix of binder material manufactured by the method as claimed in claim 10.

* * * * *